United States Patent
Suzuki et al.

(10) Patent No.: US 8,589,686 B2
(45) Date of Patent: Nov. 19, 2013

(54) VEHICLE CONTROL SYSTEM AND AUTHENTICATION METHOD

(75) Inventors: Takayuki Suzuki, Nagoya (JP); Hidemitsu Kawashima, Seto (JP)

(73) Assignee: Omron Automotive Electronics Co., Ltd., Aichi (JP)

(*) Notice: Subject to any disclaimer, the term of this patent is extended or adjusted under 35 U.S.C. 154(b) by 0 days.

(21) Appl. No.: 13/543,490

(22) Filed: Jul. 6, 2012

(65) Prior Publication Data

US 2013/0014213 A1    Jan. 10, 2013

(30) Foreign Application Priority Data

Jul. 7, 2011    (JP) ................................. 2011-151294

(51) Int. Cl.
*H04L 29/06* (2006.01)
*G06F 21/00* (2013.01)

(52) U.S. Cl.
USPC .............................................. 713/168; 726/2

(58) Field of Classification Search
None
See application file for complete search history.

(56) References Cited

U.S. PATENT DOCUMENTS

| 6,629,032 | B2 | 9/2003 | Akiyama |
| 6,922,545 | B2 | 7/2005 | Nakatsugawa |
| 7,305,284 | B2 | 12/2007 | Teshima et al. |
| 7,444,117 | B2 | 10/2008 | Katayama et al. |
| 2001/0014585 | A1 | 8/2001 | Nakatsugawa |
| 2003/0018422 | A1 | 1/2003 | Akiyama |
| 2003/0043793 | A1 | 3/2003 | Reinold et al. |
| 2004/0097263 | A1 | 5/2004 | Katayama et al. |
| 2005/0031344 | A1 | 2/2005 | Sato et al. |
| 2006/0030268 | A1 | 2/2006 | Teshima et al. |
| 2009/0091185 | A1* | 4/2009 | Konno .......................... 307/10.5 |

FOREIGN PATENT DOCUMENTS

| DE | 10342581 A1 | 4/2004 |
| EP | 1384626 A1 | 1/2004 |
| JP | 2003-101557 A | 4/2003 |
| JP | 2003-152737 A | 5/2003 |
| JP | 2006-45908 A | 2/2006 |
| JP | 2009-167638 A | 7/2009 |

OTHER PUBLICATIONS

Patent Abstracts of Japan for Japanese Publication No. 2003-152737, published May 23, 2003 (1 page).
Patent Abstracts of Japan for Japanese Publication No. 2009-167638, published Jul. 30, 2009 (1 page).
Office Action for German Application No. 10 2012 106 125.4 dated Nov. 8, 2012, with English translation thereof (13 pages).

* cited by examiner

*Primary Examiner* — Gilberto Barron, Jr.
*Assistant Examiner* — Izunna Okeke
(74) *Attorney, Agent, or Firm* — Osha Liang LLP (57) ABSTRACT

A vehicle control system has a plurality of electronic control devices that are included in a vehicle, a radio wave transmitting body that transmits operation information operating a device included in the vehicle and unique radio-wave-transmitting-body identification information using a radio signal, a first electronic control device that transmits and receive the radio signal to and from a second electronic control device and the radio wave transmitting body, and the second electronic control device that transmits and receive the radio signal to and from the first electronic control device and the radio wave transmitting body. The first electronic control device includes a first storage in which the radio-wave-transmitting-body identification information on the radio wave transmitting body or identification information on the second electronic control device is stored, and a first transmitting/receiving unit that transmits and receives the radio signal.

2 Claims, 6 Drawing Sheets

VEHICLE CONTROL SYSTEM AND AUTHENTICATION METHOD

TECHNICAL FIELD

The present invention relates to a vehicle control system and an authentication method in the vehicle control system, particularly to a vehicle control system including a plurality of electronic control devices that are provided in a vehicle and a portable device that transmits information using a radio signal, and an authentication method in the vehicle control system.

RELATED ART

Nowadays, a vehicle is controlled by many electronic control devices (hereinafter also referred to as an "ECUs") including engine control, such as a fuel injection amount, vehicle driving control, such as a transmission, braking control, such as an ABS (Antilock Brake System), and vehicle-body control, such as a door, a power window, and an air-bag. Communication between the ECUs and sharing of information are required to properly control each unit of the vehicle, and the ECUs are connected to each other through a network to construct an in-vehicle network system.

However, the ECUs are disposed in many places in the vehicle, and the number of wire harnesses, such as an electric power line connecting a battery and each ECU and a communication line (such as a CAN and a LIN) connecting the ECUs, is increased to enlarge a wiring space, which results in that the wiring is hardly performed in the vehicle. An increase in weight of the wire harness may also occur. Therefore, there is well known a configuration in which information is exchanged between the ECUs in the vehicle without wiring the communication line.

For example, Japanese Unexamined Patent Publication No. 2003-101557 discloses a vehicle communication system in order to transmit and receive the information among various electric devices mounted on the vehicle without wiring many communication lines for various networks in the vehicle. In the vehicle communication system including one or a plurality of transmitting/receiving circuits, a transmitting/receiving unit that can transmit and receive various pieces of information through the power supply line is provided in each ECU mounted on the vehicle, and each transmitting/receiving unit can conduct multiple communication in each type of the information to be transmitted and received between the ECUs using different transmission frequencies.

Japanese Unexamined Patent Publication No. 2003-152737 discloses a vehicle control system in order to be able to securely conduct radio communication between a plurality of electronic control devices without wiring a cable. In the vehicle control system, three ECUs are mounted in each area where the direct communication can wirelessly be conducted, three repeater devices are arrayed on a center line of the vehicle such that the radio communication can be conducted between the areas, and the repeater devices pass the information with a set transmission level.

Conventionally, there is well known a keyless entry system or a passive entry system, in which a lock/unlock state of the door is controlled by bidirectional communication between a portable device (FOB) carried by a user and the ECU mounted on the vehicle. There is also well known an in-vehicle device remote control system that gives permission for the ignition of the engine.

For example, Japanese Unexamined Patent Publication No. 2006-45908 discloses an in-vehicle device remote control system in order that a desirable sensing area is always ensured even if the sensing area that is an access range of a request signal transmitted from a transmitter in a vehicle interior varies in each vehicle or changes according to a radio wave environment in which the vehicle is placed. The in-vehicle device remote control system is installed in an outer edge position of a desirable vehicle-interior sensing area, includes a reference LF receiver that receives a signal transmitted from a vehicle-interior LF transmitter, and adjusts a signal transmission output level of the vehicle-interior LF transmitter based on a reception result of the reference LF receiver.

In the related art, because the portable device conducts communication with a specific ECU, authentication is performed between the portable device and the specific ECU, and the specific ECU executes a command from the portable device only when the portable device is successfully authenticated.

SUMMARY

One or more embodiments of the present invention provides, in a vehicle control system in which a plurality of ECUs are provided in the vehicle, an authentication method performed between the vehicle control system and the portable device.

In accordance with one or more embodiments of the present invention, a vehicle control system includes: a plurality of electronic control devices that are included in a vehicle; a radio wave transmitting body that transmits operation information operating a device included in the vehicle and unique radio-wave-transmitting-body identification information using a radio signal; and a first electronic control device and a second electronic control device, which transmit and receive the radio signal to and from the other electronic control device and the radio wave transmitting body, wherein the first electronic control device includes: a first storage in which the radio-wave-transmitting-body identification information on the radio wave transmitting body and/or identification information on the other electronic control device is stored; a first transmitting/receiving unit that transmits and receives the radio signal; an authentication information generator that authenticates the radio signal received by the first transmitting/receiving unit based on the identification information stored in the first storage, and generates successful authentication information when the radio wave transmitting body is successfully authenticated; and an information transmitting unit that wirelessly transmits the successful authentication information generated by the authentication information generator and the operation information received by the first transmitting/receiving unit to the second electronic control device from the first transmitting/receiving unit, the second electronic control device includes: a second storage in which the radio-wave-transmitting-body identification information on the radio wave transmitting body and/or identification information on the other electronic control device is stored; a second transmitting/receiving unit that transmits and receives the radio signal; an authentication unit that authenticates the radio signal received by the second transmitting/receiving unit is the signal from the radio wave transmitting body or the signal from the first electronic control device based on the identification information stored in the second storage; a first information acquisition unit that acquires the operation information from the radio signal received by the second transmitting/receiving unit when the authentication unit authenticates that the radio signal is the signal from the radio wave transmitting body; a second information acquisition unit that checks whether the successful authentication information is included in the radio signal received by the second transmitting/receiving unit when the authentication unit authenticates that the radio signal is the signal from the first electronic control device, and acquires the operation information from the radio signal received by the second transmitting/receiving unit when the successful authentication information is included; and a controller that controls the device of the vehicle based on the operation information acquired by the first information acquisition unit or the second information acquisition unit.

Therefore, the vehicle control system, in which the identification information transmitted from the radio wave transmitting body is received by the plurality of electronic control devices provided in the vehicle and the authentication is performed to enhance the precision of the authentication, can be provided.

In a vehicle control system in accordance with one or more embodiments of the present invention, the plurality of first electronic control devices are provided, and the controller controls the device of the vehicle based on the operation information when the second information acquisition unit acquires the successful authentication information from at least the two first electronic control devices within a predetermined time.

Therefore, the vehicle control system in which the mistaken authentication is prevented to further enhance the precision of the authentication can be provided.

In accordance with one or more embodiments of the invention, a first electronic control device used in the vehicle control system is provided.

Therefore, in the vehicle control system, in which the identification information transmitted from the radio wave transmitting body is received by the plurality of electronic control devices provided in the vehicle and the authentication is performed to enhance the precision of the authentication, the electronic control device that generates and passes the authentication information transmitted from the radio wave transmitting body can be provided.

In accordance with one or more embodiments of the invention, a second electronic control device used in the vehicle control system is provided.

Therefore, in the vehicle control system, in which the identification information transmitted from the radio wave transmitting body is received by the plurality of electronic control devices provided in the vehicle and the authentication is performed to enhance the precision of the authentication, the electronic control device that authenticates the identification information transmitted from the radio wave transmitting body and controls the device of the vehicle can be provided.

In accordance with one or more embodiments of the invention, a method for authenticating a radio wave transmitting body that transmits operation information operating a device of a vehicle and unique radio-wave-transmitting-body identification information using a radio signal in the vehicle including a plurality of electronic control devices that conduct radio communication with each other, wherein the vehicle includes: a first electronic control device in the plurality of electronic control devices; and a second electronic control device that controls the device of the vehicle based on the operation information, the first electronic control device performs authentication based on the radio-wave-transmitting-body identification information previously stored in the first electronic control device and the radio-wave-transmitting-body identification information transmitted by the radio wave transmitting body, generates successful authentication information, and transmits the successful authentication information to the second electronic control device, the second electronic control device tries the authentication based on the radio-wave-transmitting-body identification information previously stored in the second electronic control device and the radio-wave-transmitting-body identification information transmitted by the radio wave transmitting body, and determines that the authentication of the radio wave transmitting body is completed when authenticating that the signal is the signal from the radio wave transmitting body or when receiving the successful authentication information transmitted by the first electronic control device.

Therefore, the authentication method, in which the identification information transmitted from the radio wave transmitting body is received by the plurality of electronic control devices provided in the vehicle and the authentication is performed to enhance the precision of the authentication, can be provided.

In the authentication method in accordance with one or more embodiments of the present invention, the second electronic control device determines that the authentication of the radio wave transmitting body is completed when at least the two pieces of successful authentication information transmitted by the first electronic control device are received within a predetermined time.

Therefore, the authentication method in which the mistaken authentication is prevented to further enhance the precision of the authentication can be provided.

According to one or more embodiments of the invention, in the vehicle control system in which the plurality of electronic control devices provided in the vehicle receive the operation information and the electronic control devices wirelessly transmit and receive the operation information to and from each other to control the device of the vehicle, the vehicle control system and the authentication method, in which the identification information transmitted from the radio wave transmitting body is received by the plurality of electronic control devices and the authentication is performed to enhance the precision of the authentication, can be provided.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
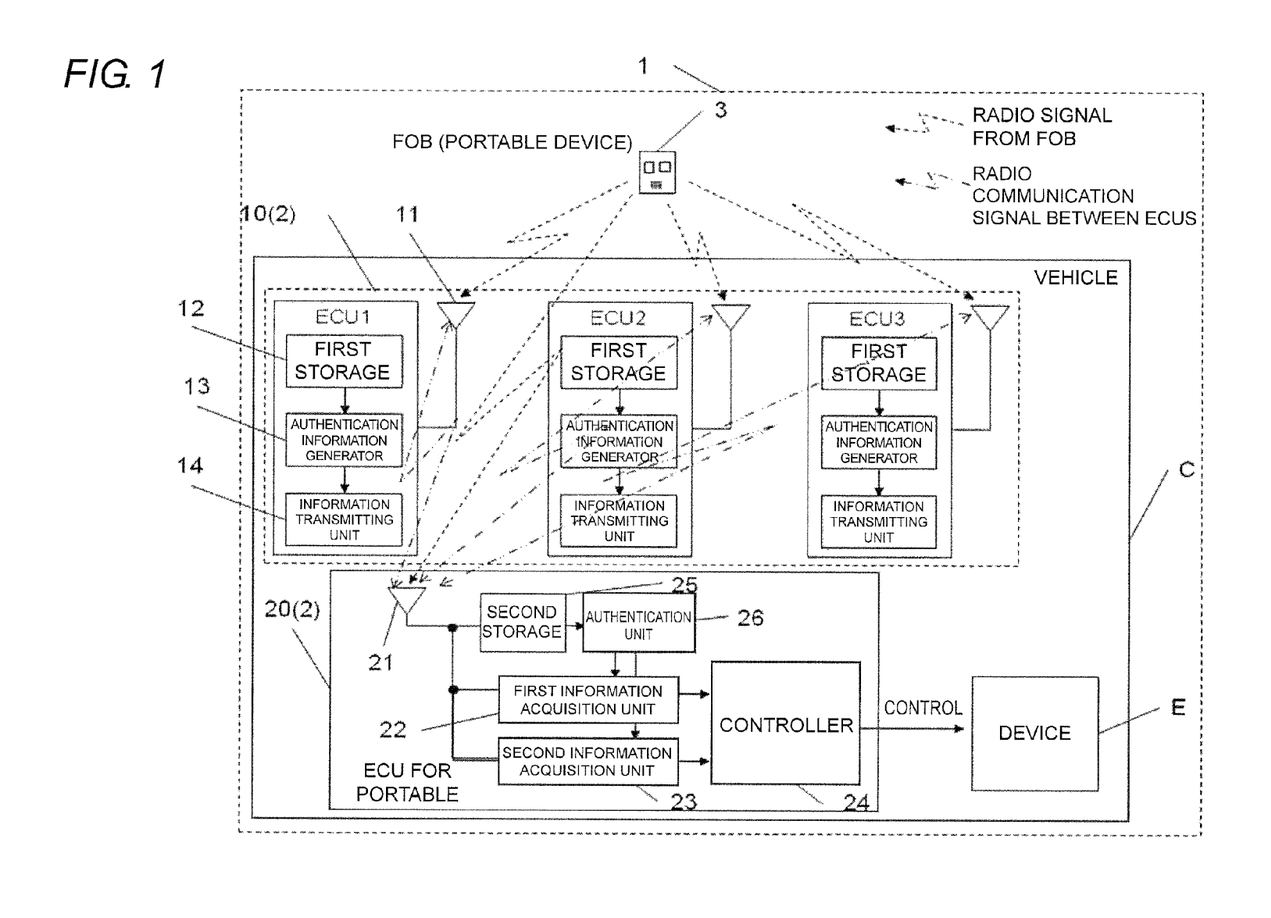
FIG. 1 is a block diagram illustrating a vehicle control system according to one or more embodiments of the invention.

FIG. 1 is a block diagram illustrating a vehicle control system 1 according to one or more embodiments of the invention. The vehicle control system 1 includes an electronic control device 2 that is provided in a vehicle C and a portable device 3 (also referred to as an FOB) that is the radio wave transmitting body transmitting information using a radio signal. The portable device 3 is not limited to a product possessed by a user of the vehicle. For example, the portable device 3 may be a communicator mounted on another vehicle or a communicator set up in a facility, such as a building. In the following description, the radio wave transmitting body includes a general communicator that controls the vehicle by conducting radio communication with an in-vehicle electronic control device.

The vehicle C includes the plurality of electronic control devices 2, some of or all the electronic control devices 2 have a communication function of conducting radio communication with the other electronic control device 2 except the own electronic control devices 2 and the portable device 3. The electronic control device 2 having the communication function includes a second electronic control device 20 (in FIG. 1, ECU for portable device) and a first electronic control device 10. The second electronic control device 20 authenticates the portable device 3, and controls a device E that is a control target mounted on the vehicle C. Although the first electronic control device 10 does not directly control the device E, the first electronic control device 10 authenticates the portable device 3, generates authentication information, and passes the radio signal including control information transmitted from the portable device 3 to the electronic control device 20.

The information transmitted from the portable device 3 that is the radio wave transmitting body includes operation information controlling the device E and unique identification information identifying the portable device 3. For example, the operation information controlling the device E is control information on lock/unlock in the case in which the device E is a door of the vehicle, and is control information on engine start/stop in the case in which the device E is an engine. In the case in which the radio wave transmitting body is the communicator mounted on another vehicle, for example, the information transmitted from the radio wave transmitting body is data that is exchanged between the vehicles, or control information processing the data. In the case in which the radio wave transmitting body is the communicator set up in the facility, such as the building, the information transmitted from the radio wave transmitting body is data or a program, which is used in the electronic control device of the vehicle.

The unique identification information identifying the portable device 3 is information having a one and only identifier authenticating the portable device 3. The unique identification information identifying the electronic control device 2 is information including a one and only identifier authenticating the electronic control device 2. In one or more embodiments of the present invention, the portable device 3 and all the electronic control devices 2 (the first electronic control device and the second electronic control device) individually have the unique identification information.

The first electronic control device 10 includes a first transmitting/receiving unit 11 and a first storage 12. The first transmitting/receiving unit 11 transmits and receives the radio signal. The identification information on the portable device 3 and the identification information on the other electronic control device 2 except the own first electronic control device 10 are stored in the first storage 12. The radio signal received by the first transmitting/receiving unit 11 is authenticated based on the identification information stored in the first storage 12. The first electronic control device 10 also includes an authentication information generator 13 and an information transmitting unit 14. The authentication information generator 13 generates successful authentication information when the portable device 3 is successfully authenticated. The information transmitting unit 14 wirelessly transmits the successful authentication information generated by the authentication information generator 13 and the operation information, which is included in the radio signal received by the first transmitting/receiving unit 11, to the second electronic control device 20 from the first transmitting/receiving unit 11. In one or more embodiments of the present invention, the vehicle C includes three first electronic control devices 10. However, there is no particular limitation to the number of first electronic control devices 10 in one vehicle C.

Typically the first transmitting/receiving unit 11 is an antenna. The first transmitting/receiving unit 11 transmits and receives the radio signal to and from the portable device 3 and the other electronic control device 2 having the communication function. The first transmitting/receiving unit 11 may be used only to transmit and receive the radio signal to and from the portable device 3 that is the radio wave transmitting body, or the first transmitting/receiving unit 11 may conduct communication with the communicator that is another radio wave transmitting body. One first transmitting/receiving unit 11 is provided in one first electronic control device 10. Alternatively, a plurality of first transmitting/receiving units 11 may be provided in order to improve sensitivity of the transmission and reception. As to a usable bandwidth, generally an RF band is used from the portable device 3 to the first transmitting/receiving unit 11 and an LF band is used from the first transmitting/receiving unit 11 to the portable device 3 and the other electronic control device 2. However, there is no particular limitation to the usable bandwidth.

Typically the first storage 12 is constructed by a memory. The identification information on the portable device 3 corresponding to the vehicle C and the identification information on the other electronic control device 2 except the first electronic control device 10 including the own first storage 12 mounted on the vehicle C are stored in the first storage 12. When the authentication is not required, the identification information may partially be stored in the first storage 12. For example, only the identification information on the portable device 3 is stored when the first electronic control device 10 does not receive the radio signal from the other electronic control device 2. The identification information on the electronic control device 2 is the unique identification information identifying the electronic control device 2 and the information including the one and only identifier authenticating the electronic control device 2. Usually the information is stored in the first storage 12 in shipping or maintenance of the vehicle C.

The authentication information generator 13 authenticates the radio signal, which is received from the portable device 3 by the first transmitting/receiving unit 11, based on the identification information on the portable device 3, which is stored in the first storage 12. When the stored identification information on the portable device 3 is matched with the received identification information on the portable device 3, namely, when the portable device 3 is successfully authenticated, the authentication information generator 13 generates successful authentication information indicating that the portable device 3 is properly authenticated and that the portable device 3 has authority to control the vehicle C.

When the radio signal from the other electronic control device 2, which is received by the first transmitting/receiving unit 11, is authenticated based on the identification information on the other electronic control device 2 except the own first electronic control device 10, which is stored in the first storage 12, and when the stored identification information on the other electronic control device 2 is matched with the identification information received from the other electronic control device 2, namely, when the other electronic control device 2 is successfully authenticated, the authentication information generator 13 generates successful authentication information indicating that the other electronic control device 2 is properly authenticated and that the other electronic control device 2 has authority to control the vehicle C.

The information transmitting unit 14 wirelessly transmits the successful authentication information generated by the authentication information generator 13, the operation information received by the first transmitting/receiving unit 11, and the own identification information to the second electronic control device 20 from the first transmitting/receiving unit 11.

The second electronic control device 20 includes a second storage 25, a second transmitting/receiving unit 21, an authentication unit 26, a first information acquisition unit 22, a second information acquisition unit 23, and a controller 24. The identification information on the portable device 3 and the identification information on the other electronic control device 2 except the own second electronic control device 20 are stored in the second storage 25. The second transmitting/receiving unit 21 transmits and receives the radio signal to and from the portable device 3 and the other electronic control device 2, such as the first electronic control device 10. The authentication unit 26 authenticates the radio signal, which is received by the second transmitting/receiving unit 21, based on the identification information stored in the second storage 25. When the authentication unit 26 authenticates the signal from the portable device 3, the first information acquisition unit 22 acquires the operation information from the radio signal received by the second transmitting/receiving unit 21. When the authentication unit 26 authenticates the signal from the first electronic control device 10, the second information acquisition unit 23 checks whether the radio signal received by the second transmitting/receiving unit 21 includes the successful authentication information generated by the authentication information generator 13. When the successful authentication information is included, the second information acquisition unit 23 determines that the authentication of the portable device 3 is completed, and acquires the operation information, which is included in the radio signal received from the portable device 3. The controller 24 controls the device E of the vehicle C based on the operation information, which is acquired from the portable device 3 by the first information acquisition unit 22 or the second information acquisition unit 23.

In one or more embodiments of the present invention, one second electronic control device 20 is provided in one vehicle C. Alternatively, a plurality of second electronic control devices 20 may be provided in one device E, or one or the plurality of second electronic control devices 20 may be provided in another device E' (not illustrated).

Typically the first transmitting/receiving unit 21 is an antenna. The first transmitting/receiving unit 21 transmits and receives the radio signal to and from the portable device 3 and the other electronic control device 2, such as the first electronic control device 10. The first transmitting/receiving unit 21 may be used only to transmit and receive the radio signal to and from the portable device 3 that is the radio wave transmitting body, or the first transmitting/receiving unit 21 may conduct communication with the communicator that is another radio wave transmitting body. One first transmitting/receiving unit 21 is provided in one second electronic control device 20. Alternatively, a plurality of first transmitting/receiving units 21 may be provided in order to improve the sensitivity of the transmission and reception. As to the usable bandwidth, generally the RF band is used from the portable device 3 to the first transmitting/receiving unit 21 and the LF band is used from the first transmitting/receiving unit 21 to the portable device 3 and the other electronic control device 2. However, there is no particular limitation to the usable bandwidth.

Typically the second storage 25 is constructed by a memory. One of or both the identification information on the portable device 3 corresponding to the vehicle C and the identification information (including the identification information on the first electronic control device 10) on the other electronic control device 2 except the second electronic control device 20 including the own second storage 25 mounted on the vehicle C are stored in the second storage 25. Usually the information is stored in the second storage 25 in shipping or maintenance of the vehicle C.

The authentication unit 26 authenticates the radio signal, which is received by the second transmitting/receiving unit 21, based on the identification information on the portable device 3 and/or the identification information on the other electronic control device 2, which is stored in the second storage 25. When the stored identification information on the portable device 3 and/or the other electronic control device 2 is matched with the received identification information on the portable device 3 and/or the other electronic control device 2, namely, when the portable device 3 and/or the other electronic control device 2 is successfully authenticated, the authentication unit 26 determines that the portable device 3 and/or the other electronic control device 2 is properly authenticated and that the portable device 3 and/or the other electronic control device 2 has authority to control the vehicle C. When the authentication unit 26 authenticates the first electronic control device 10, and when the second information acquisition unit 23 acquires the successful authentication information from first electronic control device 10, the authentication unit 26 may authenticate the portable device 3. The identification information on the other electronic control device 2 is received among the plurality of electronic control devices provided in the vehicle, and the authentication is performed. Therefore, the vehicle control system in which precision of the authentication is enhanced can be provided.

When the authentication unit 26 authenticates the signal from the portable device 3, the first information acquisition unit 22 acquires the operation information from portable device 3 from the radio signal received by the second transmitting/receiving unit 21. When the information transmitting unit 14 of the first electronic control device 10 transmits the identification information on the first electronic control device 10 from the first transmitting/receiving unit 11, and when the authentication unit 26 authenticates the signal from the first electronic control device 10, the second information acquisition unit 23 checks whether the radio signal received by the second transmitting/receiving unit 21 includes the successful authentication information generated by the authentication information generator 13. When the successful authentication information is included, the second information acquisition unit 23 determines that the authentication of the portable device 3 is completed, and acquires the operation information, which is included in the received radio signal generated by the portable device 3.

The controller 24 controls the device E of the vehicle C based on the transmitted control information, which is initially generated by the portable device 3 and acquired by the first information acquisition unit 22 or the second information acquisition unit 23. That is, in the vehicle control system 1 according to one or more embodiments of the present invention, the authentication unit 26 of the second electronic control device 20 or the authentication information generator 13 of the first electronic control device 10 authenticates the portable device 3 in order that the controller 24 of the second electronic control device 20 controls the device E based on the operation information from the portable device 3.

As a result, in the vehicle control system 1, the plurality of electronic control devices 2 provided in the vehicle C receives the identification information transmitted from the portable device 3, and the electronic control device 2 that receives the identification information authenticates the portable device 3, which allows the precision of the accuracy to be enhanced. Therefore, in the vehicle control system 1, the controller 24 of the second electronic control device 20 can control the device E of the vehicle C based on the information, which is directly received from the portable device 3 and acquired by the first information acquisition unit 22, or the information, which is acquired by the second information acquisition unit 23 through the information transmitting unit 14 of the first electronic control device 10.

Sometimes both the second electronic control device 20 that controls the device E and another first electronic control device 10 receive the radio signal from the portable device 3. When the authentication information generator 13 of the first electronic control device 10 generates the authentication information while the authentication unit 26 of the second electronic control device 20 performs the authentication, both the first information acquisition unit 22 and the second information acquisition unit 23 may acquire the operation information from the portable device 3. In this case, the second electronic control device 20 may give a priority to the operation information acquired by the first information acquisition unit 22, and perform the control based on the information, which is directly received from the portable device 3 by the first transmitting/receiving unit 21. Compared with the radio signal through the first electronic control device 10, the radio signal directly received from the portable device 3 reaches the second electronic control device 20 faster, and the directly-received radio signal has higher reliability from the viewpoint of signal quality. However, the invention is not limited to the above. For example, the control may be performed using the radio signal that is determined by majority vote among radio signals passed by many first electronic control devices 10.

Figure 2:
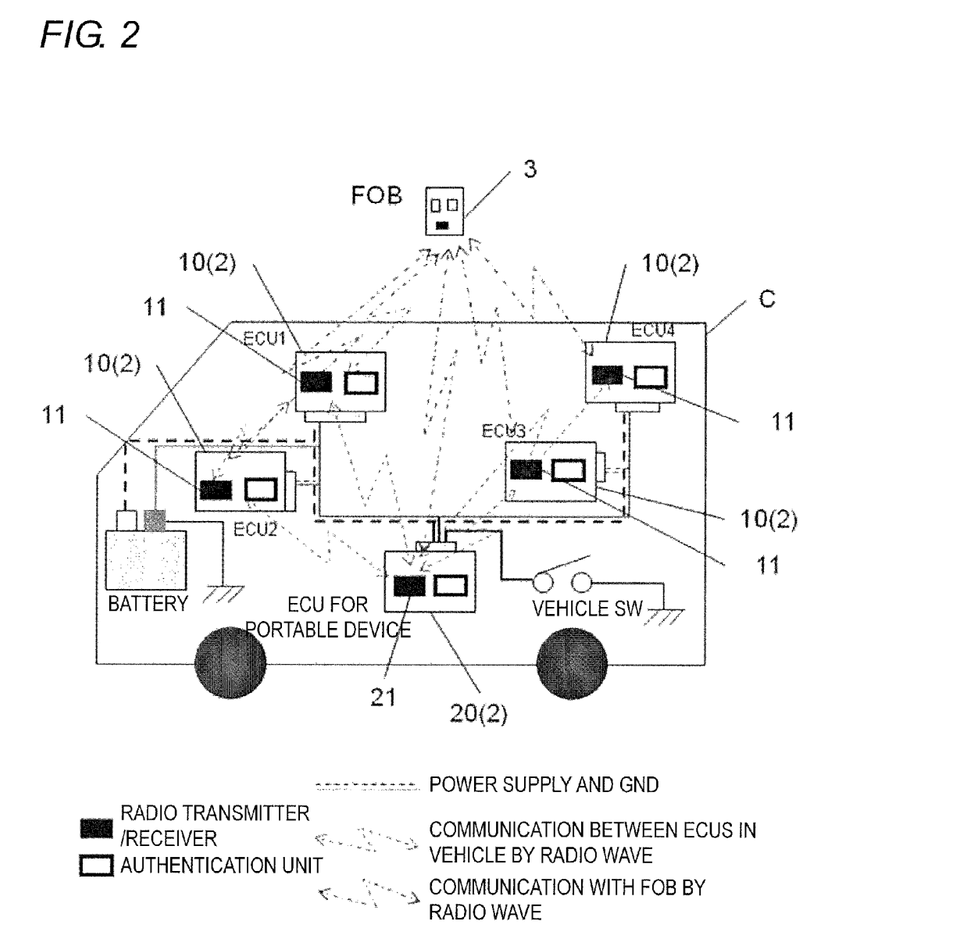
FIG. 2 is a view illustrating the case in which the vehicle control system according to one or more embodiments of the present invention is mounted on a vehicle.

FIG. 2 is a view illustrating the case in which the vehicle control system according to one or more embodiments of the present invention is actually mounted on the vehicle. Referring to FIG. 2, one electronic control device 20 (second electronic control device, ECU for portable device in FIG. 2) and four first electronic control devices 10 are provided together with a battery. Each electronic control device is connected to the battery and the power supply line to receive the electric power.

Figure 6:
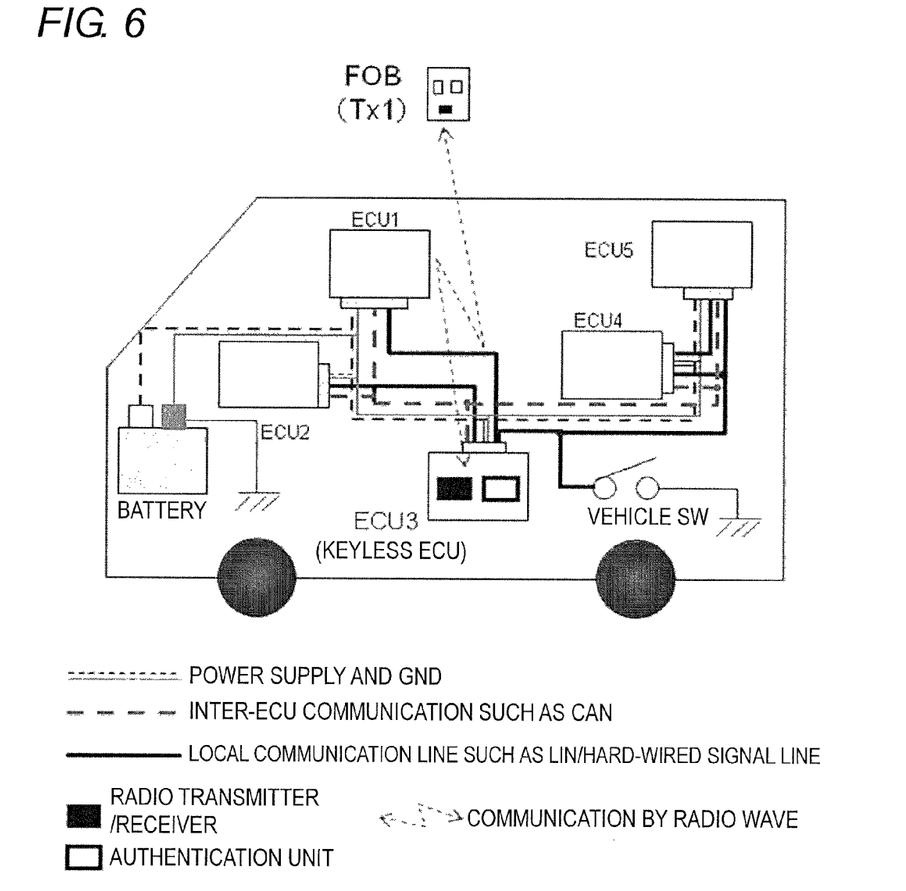
FIG. 6 is a view illustrating the case in which a vehicle control system of the related art is mounted on the vehicle.

The comparison of the vehicle control system according to one or more embodiments of the present invention to that of the related art will be described with reference to FIG. 6. FIG. 6 is a view illustrating the case in which the vehicle control system of the related art is mounted on the vehicle. Similarly to the vehicle control system in FIG. 2, one electronic control device (in FIG. 6, keyless ECU), corresponding to the electronic control device 20, which controls the device and four electronic control devices are provided together with a battery. Each electronic control device is connected to the battery and the power supply line to receive the electric power. A wire harness for CAN (Controller Area Network) in which communication is conducted among ECUs and a wire harness for LIN (Local Interconnect Network) in which local communication is conducted are disposed.

In the related art, many wire harnesses are required. On the other hand, the wire harness, which is required in the related art, is rarely required according to one or more embodiments of the present invention, because the radio communication is conducted between the second electronic control device 20 and the first electronic control device 10. Therefore, there is a margin in wiring of the vehicle C, a degree of freedom can be increased in designing and manufacturing the vehicle, and weight reduction of the vehicle is achieved.

Referring to FIG. 6, the FOB (portable device) can conduct communication only with the keyless ECU, and the authentication unit is included only in the keyless ECU. Therefore, the FOB cannot conduct communication with another ECU to perform the authentication. Accordingly, when the FOB is located in a position in which the radio signal hardly reaches the keyless ECU of the vehicle, the precision of the communication (the precision of the reception and the precision of the authentication) between the FOB and the keyless ECU is degraded. For example, it is necessary to install the antenna in another place in the vehicle to improve the precision of the communication with the FOB.

On the other hand, in FIG. 2, the authentication unit is included in not only the second electronic control device 20 but also the first electronic control devices 10 disposed in places of the vehicle C, and the FOB can conduct radio communication with each first electronic control device 10 to send the necessary information to the second electronic control device 20. Therefore, the transmission and reception of the radio signal hardly depends on the position of the FOB compared with the related art. It is not necessary to separately provide the antenna in the vehicle. Accordingly, in the vehicle control system 1, the precision of the reception or the precision of the authentication of the information transmitted from the portable device 3 can be enhanced, the authentication can securely be performed to send the information to the second electronic control device 20.

Figure 3:
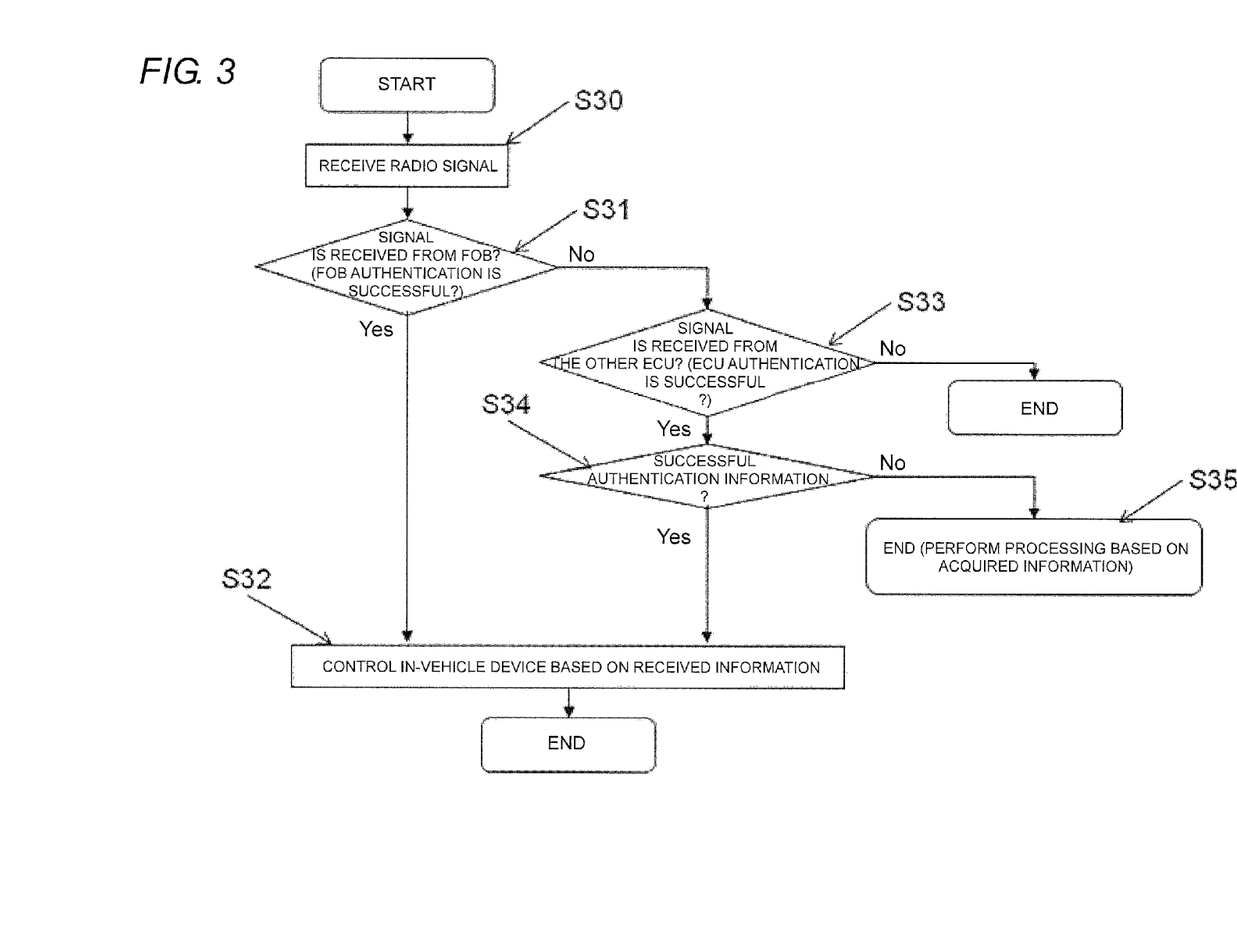
FIG. 3 is a flowchart in the vehicle control system according to one or more embodiments of the present invention (part 1)

FIG. 3 is a flowchart of the second electronic control device 20 according to one or more embodiments of the present invention. Step is abbreviated to S. In S30, the second electronic control device 20 (in FIG. 3, ECU for portable device) receives the radio signal. In S31, the second electronic control device 20 checks whether the received radio signal is the radio signal from the FOB (portable device), and checks the identification information on the FOB, which is included in the radio signal, based on the identification information on the FOB, which is previously stored in the second storage. When the FOB is successfully authenticated, in S32, the second electronic control device 20 controls the device of the vehicle based on the operation information, which is included in the radio signal and transmitted from the FOB.

When failing to authenticate the FOB, the second electronic control device 20 checks whether the radio signal is received from another ECU (first electronic control device 10) in S33. When the radio signal is not received from another ECU, the flow is ended because signal, such as a noise, which does not relate to the control, is received.

When the radio signal is received from another ECU, the second electronic control device 20 checks whether the successful authentication information generated by another ECU is included in the received radio signal in S34. When the successful authentication information is not included, the flow is ended after processing based on the information acquired from the received radio signal is performed. When the successful authentication information is included, the second electronic control device 20 controls the device of the vehicle based on the operation information, which is transmitted from the FOB through another ECU and included in the radio signal, in S32.

Figure 4:
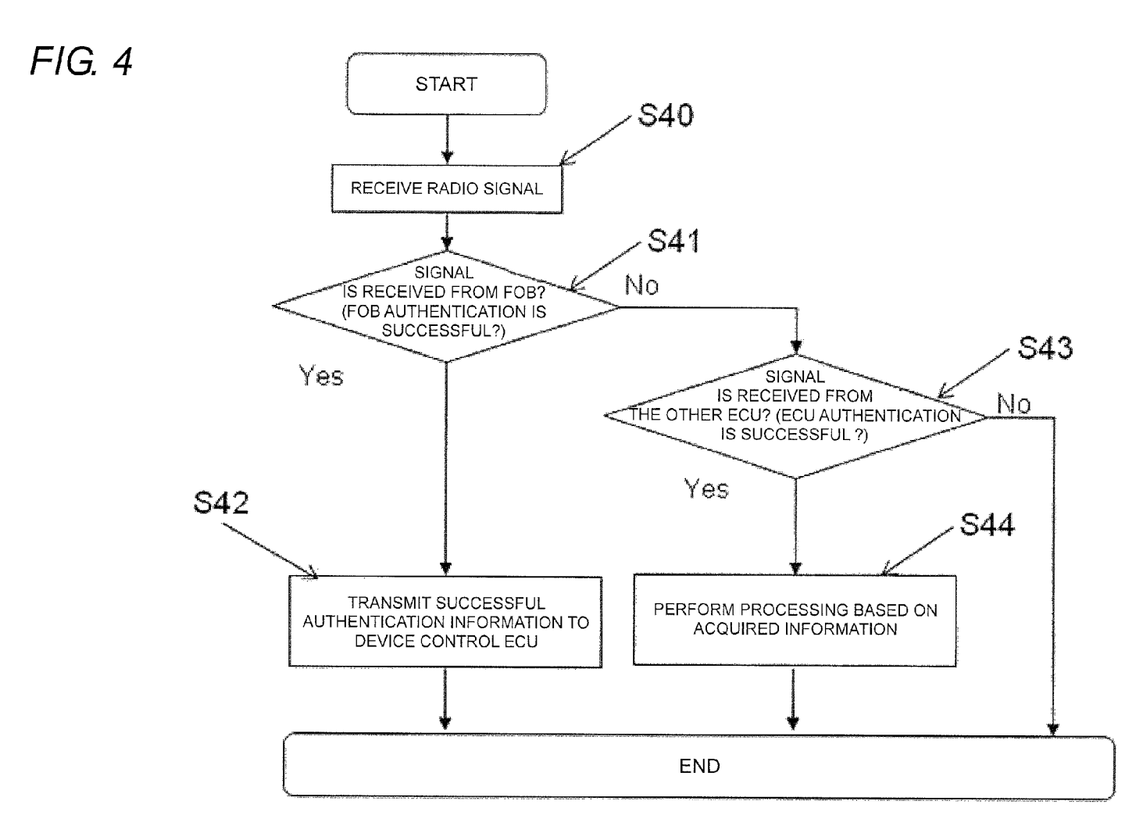
FIG. 4 is a flowchart in the vehicle control system according to one or more embodiments of the present invention (part 2)

FIG. 4 is a flowchart of the first electronic control device 10 according to one or more embodiments of the present invention. In S40, the first electronic control device 10 receives the radio signal. In S41, the first electronic control device 10 checks (authenticates) whether the received radio signal is the radio signal from the FOB based on the identification information included in the received radio signal and the identification information on the FOB, which is previously stored in the first storage. When the FOB is successfully authenticated, in S42, the first electronic control device 10 generates the successful authentication information, and transmits the successful authentication information, the operation information included in the radio signal from the FOB, and the own identification information to the second electronic control device 20 (in FIG. 4, ECU for portable device).

When failing to authenticate the FOB, the first electronic control device 10 checks whether the radio signal is received from another ECU in S43. When the radio signal is not received from another ECU, the flow is ended because signal, such as a noise, which does not relate to the control, is received. When the radio signal is received from another ECU, and when the authentication is successfully performed, the first electronic control device 10 performs processing based on the acquired information in S44.

These steps are a method for authenticating the portable device 3 that transmits the operation information operating the device E of the vehicle C and the unique identification information using the radio signal in the vehicle C including the plurality of electronic control devices that conduct radio communication with each other, wherein the vehicle C includes: the first electronic control device 10 in the plurality of electronic control devices; and the second electronic control device 20 that controls the device E of the vehicle C based on the operation information, the first electronic control device 10 performs authentication based on the identification information previously stored in the first electronic control device 10 and the identification information transmitted by the portable device 3, generates the successful authentication information, and transmits the successful authentication information to the second electronic control device 20, and the second electronic control device 20 determines that the authentication of the portable device 3 is completed when successfully authenticating the portable device 3 based on the identification information previously stored in the second electronic control device 20 and the identification information transmitted by the portable device 3 or when receiving the successful authentication information transmitted by the first electronic control device 10.

Figure 5:
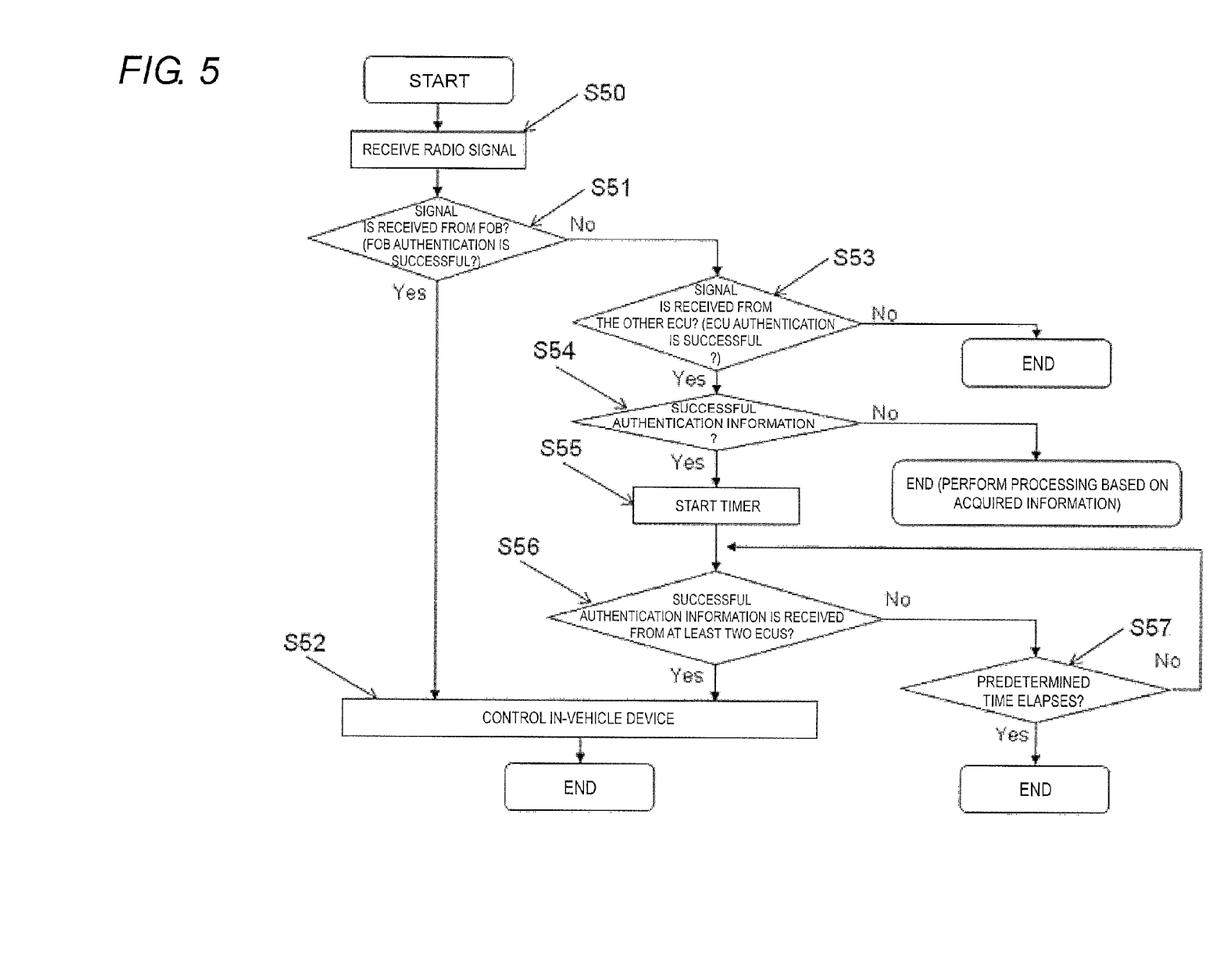
FIG. 5 is a flowchart in a vehicle control system according to one or more embodiments of the present invention.

FIG. 5 is a flowchart of the second electronic control device 20 according to one or more embodiments of the present invention. In S50, the second electronic control device 20 receives the radio signal. In S51, the second electronic control device 20 checks whether the received radio signal is the radio signal from the FOB (portable device), and checks the identification information on the FOB, which is included in the radio signal, based on the identification information on the FOB, which is previously stored in the second storage. When the FOB is successfully authenticated, in S52, the second electronic control device 20 controls the device of the vehicle based on the operation information, which is included in the radio signal and transmitted from the FOB.

When failing to authenticate the FOB, the second electronic control device 20 checks whether the radio signal is received from another ECU (first electronic control device 10) in S53. When the radio signal is not received, the flow is ended because the second electronic control device 20 does not receive the radio signal from any ECU.

When the radio signal is received from another ECU, the second electronic control device 20 checks whether the successful authentication information generated by another ECU is included in the received radio signal in S54. When the successful authentication information is not included, the flow is ended after processing based on the information acquired from the received radio signal is performed.

When the successful authentication information is included, the second electronic control device 20 sets and starts a timer in S55. In S56, the second electronic control device 20 checks whether the radio signals are received from at least two other ECUs, and checks whether the successful authentication information generated by another ECU is included in the received radio signal. When the successful authentication information is not received from at least two other ECUs, the second electronic control device 20 checks whether a predetermined time elapses on the set timer in S57. The flow returns to S56 when the predetermined time does not elapse, and the flow is ended when the predetermined time elapses.

When the successful authentication information is received from at least two other ECUs, the second electronic control device 20 controls the device of the vehicle based on the operation information, which is transmitted from the FOB through another ECU and included in the radio signal, in S52. That is, the controller 24 controls the device E of the vehicle C based on the operation information from the portable device 3, when the second information acquisition unit 23 acquires the successful authentication information from at least two first electronic control devices 10 within the predetermined time. The second electronic control device 20 may authenticate the portable device 3 when at least two pieces of successful authentication information transmitted by the first electronic control devices 10 are acquired within the predetermined time. Therefore, the authentication method for preventing the mistaken authentication to further enhance the precision of the authentication can be provided.

The invention is not limited to the above embodiments, and various changes and modifications can be made without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle control system comprising:
    a plurality of electronic control devices that are included in a vehicle;
    a radio wave transmitting body that transmits operation information operating a device included in the vehicle and unique radio-wave-transmitting-body identification information using a radio signal;
    a plurality of first electronic control devices that transmit and receive the radio signal to and from a second electronic control device and the radio wave transmitting body; and the second electronic control device that transmits and receives the radio signal to and from the plurality of first electronic control devices and the radio wave transmitting body, wherein each of the plurality of first electronic control devices includes:
- a first storage in which the radio-wave-transmitting-body identification information on the radio wave transmitting body or identification information on the second electronic control device is stored;
- a first transmitting/receiving unit that transmits and receives the radio signal;
- an authentication information generator that authenticates the radio signal received by the first transmitting/receiving unit based on the identification information stored in the first storage, and generates successful authentication information when the radio wave transmitting body is successfully authenticated; and
- an information transmitting unit that wirelessly transmits the successful authentication information generated by the authentication information generator and the operation information received by the first transmitting/receiving unit to the second electronic control device from the first transmitting/receiving unit, wherein the second electronic control device includes:
- a second storage in which the radio-wave-transmitting-body identification information on the radio wave transmitting body or identification information on the plurality of first electronic control devices is stored;
- a second transmitting/receiving unit that transmits and receives the radio signal;
- an authentication unit that authenticates the radio signal received by the second transmitting/receiving unit is the signal from the radio wave transmitting body or the signal from the plurality of first electronic control devices based on the identification information stored in the second storage;
- a first information acquisition unit that acquires the operation information from the radio signal received by the second transmitting/receiving unit when the authentication unit authenticates that the radio signal is the signal from the radio wave transmitting body;
- a second information acquisition unit that checks whether the successful authentication information is included in the radio signal received by the second transmitting/receiving unit when the authentication unit authenticates that the radio signal is the signal from the plurality of first electronic control devices, and acquires the operation information from the radio signal received by the second transmitting/receiving unit when the successful authentication information is included; and
- a controller that controls the device of the vehicle based on the operation information acquired by the first information acquisition unit or the second information acquisition unit, wherein the controller controls the device of the vehicle based on the operation information when the second information acquisition unit acquires the successful authentication information from at least two of the plurality of first electronic control devices within a predetermined time.

2. A method for authenticating a radio wave transmitting body that transmits operation information operating a device of a vehicle and unique radio-wave-transmitting-body identification information using a radio signal in the vehicle including a plurality of electronic control devices that conduct radio communication with each other, wherein the vehicle includes:
- a plurality of first electronic control devices in the plurality of electronic control devices; and
- a second electronic control device that controls the device of the vehicle based on the operation information, the method comprising:
- performing authentication via the plurality of first electronic control devices based on the radio-wave-transmitting-body identification information previously stored in the plurality of first electronic control devices and the radio-wave-transmitting-body identification information transmitted by the radio wave transmitting body,
- generating via the plurality of first electronic control devices successful authentication information;
- transmitting via the plurality of first electronic control devices the successful authentication information to the second electronic control device;
- trying the authentication via the second electronic control device based on the radio-wave-transmitting-body identification information previously stored in the second electronic control device and the radio-wave-transmitting-body identification information transmitted by the radio wave transmitting body; and
- determining via the second electronic control device that the authentication of the radio wave transmitting body is completed when authenticating that the signal is the signal from the radio wave transmitting body or when receiving the successful authentication information transmitted by the plurality of first electronic control devices, wherein the second electronic control device determines that the authentication of the radio wave transmitting body is completed when at least the two pieces of successful authentication information transmitted by the plurality of first electronic control devices are received within a predetermined time.

* * * * *